June 24, 1930.  J. P. REMINGTON  1,768,489
VARIABLE SPEED GEARING
Filed Jan. 25, 1929
FIG. I
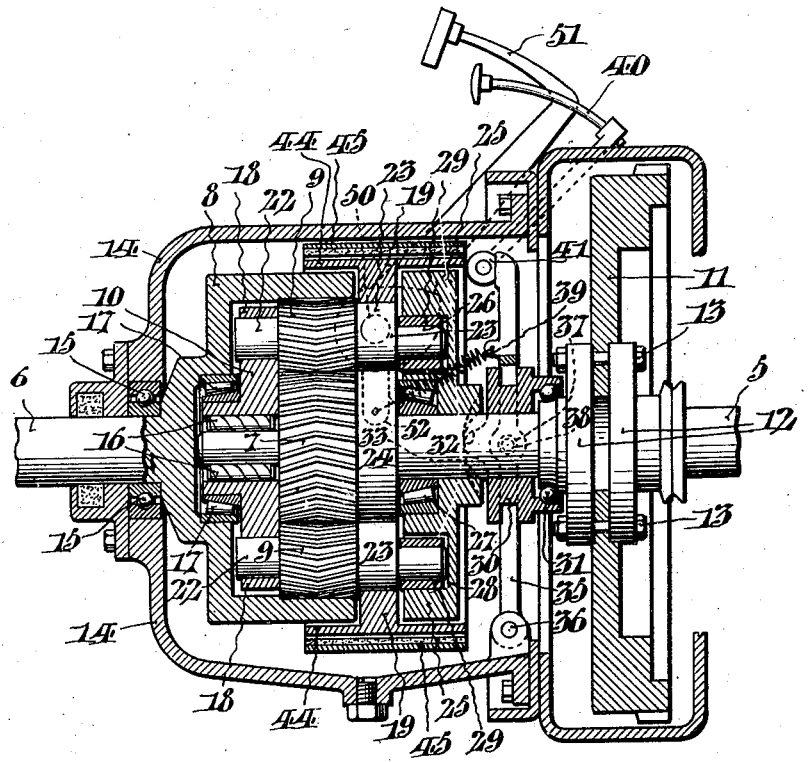
FIG. II
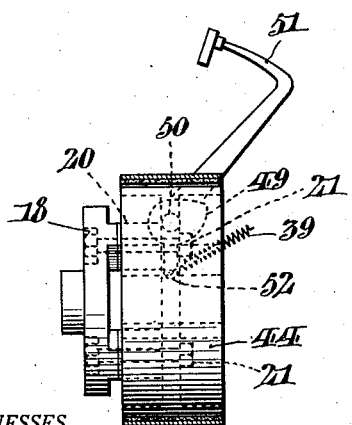
FIG. III
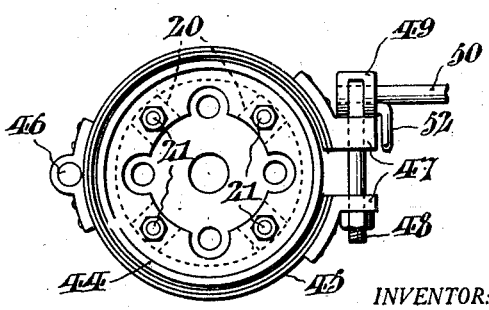
WITNESSES
INVENTOR:
Joseph Percy Remington,
BY
ATTORNEYS.

Patented June 24, 1930

1,768,489

UNITED STATES PATENT OFFICE

JOSEPH PERCY REMINGTON, OF PHILADELPHIA, PENNSYLVANIA, ASSIGNOR TO JAMES H. BELL, OF PHILADELPHIA, PENNSYLVANIA

VARIABLE-SPEED GEARING

Application filed January 25, 1929. Serial No. 334,875.

This invention relates to variable speed gearing. Such gearing, for example, may be inserted in shafting anywhere between the source of power and the ultimate load, or incorporated within the cages of electric motors (especially alternating current motors), or applied to the crank shafts of internal combustion engines for automotive and other purposes. The invention affords a simple, rugged, compact, and relatively efficient type of gearing for such uses. In the automotive field, my gearing presents the advantage of allowing the usual clutch mechanism to be entirely omitted.

In the drawings, Fig. I shows an axial mid-section through a variable speed gearing conveniently embodying my invention.

Fig. II is a fragmentary side view of certain parts which appear in section in Fig. 1, one of the parts being also shown in section in Fig. II; and, Fig. III is an end view of some of the parts shown in Figs. I and II.

The gearing here illustrated is of a differential epicyclic type. Besides co-axial driving and driven shafts 5, 6, the mechanism shown comprises a driving gear 7 keyed fast on the shaft 5, an internal driven gear 8 fast to the shaft 6, and an intermediate member or connective device comprising one or more intermediate gears 9 (in the drawings, two out of a series of four are indicated) meshing with the driving and driven gears 7, 8, and carried by a rotor 10 mounted to revolve co-axially with the gears 7, 8. As shown, the gears 7, 8, 9 are of herringbone type. The driving shaft 5 carries the usual automobile fly wheel 11, shown as clamped spaced between flanges 12, on sections of the shaft 5 by bolts 13 extending through said flanges and the fly wheel web. The parts are all enclosed in a casing 14, which carries ball bearings 15 for the driven shaft 6. As shown in Fig. I, roller bearings 16, 17 are interposed between the end of the shaft 5 and the intermediate rotor 10, and between said rotor and the gear member 8 on the driven shaft 6. These roller bearings 16, 17 help to maintain the shafts 5, 6 in alignment and to prevent bending or "whipping" of the end of the shaft 5. As shown in Figs. I, II and III, the rotor 10 comprises two disk-like elements 18, 19 spaced apart to accommodate the gears 7 and 9, but having abutting "post" portions 20 intermediate the gears 9. These elements 18, 19 are secured together by bolts 21 extending through the posts 20 (Fig. III). The gears 9 have trunnion extensions 22, 23 which revolve in bearing apertures in the parts 18, 19. As shown in Fig. III, the bearings for the trunnion extensions 23 do not extend entirely around the latter, but only about 270°, the center of the disk 19 being open. In the open center of the disk 19 is a disk 24 (fast to the shaft 5) whose periphery engages the trunnions 23. Preferably, the trunnions 23 and the disk 24 correspond in diameter to the pitch circles of the gears 9 and 7.

The general principles of operation of an epicyclic gear train such as above described are, briefly, as follows:

If the epicyclic gears 9 and the rotor 10 are both allowed to turn freely, then the gears 9 will travel idly around the internal gear 8, which will remain at rest, as well as the shaft 6.

If the epicyclic gears 9 are not allowed to turn on their axes, while the rotor 10 is left free to turn, then the gears 7, 8, 9 and the rotor 10 will all revolve together, giving what amounts to a direct drive from the shaft 5 to the shaft 6.

If, on the other hand, the rotor 10 is held fixed and the gears 9 are allowed to turn freely on their axes, then the shaft 6 will be driven in the opposite direction from the shaft 5.

If, again, the gears 9 and the rotor 10 are neither allowed to turn freely nor held fixed, but allowed to turn only to a limited extent, then the speed of the driven shaft 6 will depend on the rate of movement of the rotor 10, and may be varied and controlled by suitably controlling its revolution.

In a word, the movement (or arrest) of the intermediate member including the rotor 10 and the gears 9 controls the transmission ratio of the gear train.

The movement of the ratio-controlling means at 9, 10 may be controlled by resistance to the rotation of the gears 9, acting through suitable cam or inertia means 25 coacting with cranks 26 on the ends of the gear trunnions 23. As shown, this inertia means 25 consists of a disk or fly-wheel rotatable coaxially with the rotor 10, and mounted around the shaft 5 on a conical anti-thrust roller bearing 27, against the disk 24. This disk or fly-wheel 25 has an eccentric circular groove 28 in one side, whose outer wall serves as an internal cam track or eccentric for anti-friction rollers 29 on the gear cranks 26, which do not, however, normally engage the inner side of said grove. The mechanical disadvantage of this mechanism is such that even a slight resistance to turning of the part 25 relative to the shaft 5 will overcome the tendency of the cranks 26 to turn said part 25 by their action on the cam track at 28. Furthermore, assuming that the eccentric groove 28 simply acts as a circular wedge, and that its wedge surface is twenty (20) times the length of its width or height, and that the member or fly wheel 25 weighs five (5) pounds, or has five (5) pounds inertia in starting the mechanism; it will now be evident that it would only require a little more than one hundred (100) pounds total pressure of the eccentric cranks 26 or a little over 33⅓ pounds pressure on each said crank to effect the unhampered rotation of the member or fly wheel 25. It is also to be noted that whenever the mechanism is started, it is necessary for the member or fly wheel 25 to rotate, as will always happen unless the device is capable of carrying the full load in clutch, said fly wheel rotates in the opposite direction to that of the shaft 5, thus providing for gradual pick-up of load in case of very rapid acceleration; and this is one of the important reasons why an excessive amount of eccentricity for the surface 28 is not required.

Loose on the shaft 5 adjacent the cam disk 25 is a grooved collar 30, with an anti-thrust ball bearing 31 against a shoulder on said shaft, which is shown as formed by the hub of one of the flanges 12. The collar 30 has a pair of rounded lateral projections 32 that coact with corresponding double arcuate "crown" cam surfaces 33 on the hub of the disk 25, formed by the curved and sloping bottoms of a couple of arcuate grooves or recesses in the end of said hub.

While the projections 32 are in the very bottoms of the cam recesses 33, the parts 25 and 30 are free and loose between the bearings 27, 31, so as to revolve together freely relative to the shaft 5, without any friction or binding. Under this condition, therefore, the turning of the gears 9 and the revolution of the rotor 10 will be unrestricted by the element 25, and no motion will be transmitted to the shaft 6.

But if for any reason the parts 25, 30 are caused to turn relative to one another a little, either way, so that the projections 32 are displaced "up" the sloping bottoms of the recesses 33, then there is a wedging action which separates and expands the parts 25, 30 in the axial direction, crowding and tightening them against their bearings 27, 31. Under this condition, the rotation of the parts 25, 30 relative to the shaft 5 and the revolution of the gears 9 will be resisted by the increased friction in the bearings 27, 31, due to the pressure; and the shaft 6 will be driven at a speed corresponding to the pressure and friction of these bearings. And if the pressure on the bearings 27, 31 should be so great as to prevent the parts 30, 25 from turning relative to the shaft 5, and the gears 9 from turning at all, then the parts 5, 30, 25, 7, 10, 8, and 6 will all revolve together at the same speed: i. e., there will be a "direct drive" from the shaft 5 to the shaft 6.

As a means of controlling the inter-relation of the parts 30, 25, I have shown a forked lever 35 pivoted to the casing 14 at 36, and provided with anti-friction rollers 37 on pins 38 for engaging in the groove of the collar 30 at opposite sides of the shaft 5. As shown in Fig. I, a helical tension spring 39 acts to draw this lever 35 to the left and hold the collar projections 32 against the bottoms of the cam recesses 33. The slight vibration of the rotating parts coacts with the pull of the spring 39 and the slope of the cam surfaces 33 to cause the part 30 to adjust itself, angularly, to the proper position for this. Thus the gearing automatically tends to assume this "neutral", non-driving condition.

As shown in Fig. I, the usual accelerator pedal device 40 has a flat-sided hub 41 located adjacent the upper end of the lever 35. So long as the pedal 40 remains in its normal raised position, as shown in Fig. I, the flat of the hub 41 hardly touches the lever 35; but when the pedal 40 is depressed, the flat of the hub 41 acts as a cam to force the lever 35 to the right, against the pull of the spring 39, thus pressing the collar 30 against its bearing 31 and thereby causing collar to turn a little with the shaft 5. This quickly alters the angular relation of the parts 30, 25, causing the collar projections 32 to coact with the cam surfaces 33, thereby to "expand" the parts 25, 30 and thereby exert pressure on their bearings 27, 31. As a result, rotation of the part 25 relative to the shaft 5 is resisted, and thus the shaft 6 is caused to be driven at a reduced speed as compared with the shaft 5.

If sufficient pressure is exerted on the pedal 40, the parts 25, 30 can be prevented from turning relative to the shaft 5, and a direct drive to the shaft 6 thus established.

As a means of holding the rotor 10 stationary, and thus driving in "reverse," the disk element 19 is provided with lateral flanges forming a drum 44 to coact with a surrounding stationary brake band 45. This brake band 45 may be anchored at its middle at one side of the drum 44, as shown at 46. At the other side, its ends may be provided with apertured lugs 47. The band 45 may be tightened on the drum 44 by means of a bolt rod 48 extending through the lugs 47 and having a double cam 49 pivoted on its flattened upper end, to act on the upper lug 47. The cam 49 may be fast to the shaft 50 that pivots it to the pull rod 48, and may be operated by a pedal device 51 connected to this shaft. Furthermore, when operating in "reverse" it is to be remarked that when the rotor 10 is held stationary, the rotation of the eccentric cranks 26 forces the member or fly wheel 25 to revolve, which I have found to be a desirable feature, since it causes the device to possess a governor-like characteristic that prevents sudden acceleration in reverse.

As here shown, the spring 39 is connected to a crank arm 52 depending from the shaft 50, so that when the brake 45 is tightened for reverse, extra tension will be put on the spring, to assure against any resistance to free rotation of the part 25 with the shaft 5.

Having thus described my invention, I claim:

1. The combination with an epicyclic transmission gearing and its revolubly mounted intermediate gears, of a revoluble circular wedge mechanism actuated by said intermediate gears, and means for yieldingly resisting revolution of said circular wedge mechanism by said gears and thus controlling the transmission ratio.

2. The combination with an epicyclic transmission gearing and its revoluble intermediate member and gears, of a circular wedge mechanism including a cam and a co-operative wedge member mounted co-axially with said intermediate member for revolution by its said gears, and thrust means co-active with the wedge member for yieldingly resisting revolution of said wedge member and thus controlling the transmission ratio.

3. The combination with an epicyclic transmission gearing and its revoluble intermediate member and gears; of an eccentric mounted co-axially with said intermediate member; means actuated by said gears for rotating said eccentric; and means for yieldingly resisting revolution of said eccentric as aforesaid, and for varying the resistance and thus varying transmission ratio of the gearing.

4. The combination with an epicyclic transmission gearing and its revoluble intermediate member and gears; of an eccentric mounted for rotation co-axially with said intermediate member; cranks actuated by said gears co-acting with said eccentric to rotate the same; and means for variably resisting revolution of said eccentric as aforesaid, and thus varying the transmission ratio.

5. The combination with an epicyclic transmission gearing and its revoluble intermediate member and gears, including a shaft for said intermediate member; of an eccentric and a thrust bearing therefor on said shaft; cranks actuated by said gears co-acting with said eccentric to rotate the same; a rotatable member and a thrust bearing therefor on said shaft; and means including a wedge device between said members for crowding them against their bearings on the shaft and thus varying the resistance to rotation of said eccentric and the transmission ratio of the gearing.

In testimony whereof, I have hereunto signed my name at Philadelphia, Pennsylvania, this 3d day of January, 1929.

JOSEPH PERCY REMINGTON.